*INVENTORS.*
RICHARD E. WILLIAMS
HAROLD C. GLASS
*BY*
*Thomas & Crickenberger*
ATTORNEYS.

May 29, 1962 R. E. WILLIAMS ET AL 3,037,076

DATA PROCESSING AND WORK RECOGNITION SYSTEM FOR SPEECH-TO-DIGITAL CONVERTER

Filed Dec. 18, 1959 8 Sheets-Sheet 4

(PHOTOGRAPHIC IMAGE
WITH DIFFERENT DENSITY
SECTIONS)

3,037,076

DATA PROCESSING AND WORK RECOGNITION SYSTEM FOR SPEECH-TO-DIGITAL CONVERTER

Richard E. Williams, Fairfax, and Harold C. Glass, Falls Church, Va., assignors to Scope, Inc., Fairfax, Va., a corporation of New Hampshire Filed Dec. 18, 1959, Ser. No. 860,388
11 Claims. (Cl. 178—43.5)

This invention relates to a data processing system, and more particularly to a system for receiving digital information corresponding to speech sounds and assembling and translating this information into digital information corresponding to words.

An analysis of human speech will reveal that spoken words are composed of certain basic sounds which lend distinctiveness and intelligibility to the words. It has been found that approximately forty such basic sounds will make up a speech alphabet of sufficient scope to encompass a large vocabulary of basic words. These sounds, or phonemes as they are sometimes called, have dimensions of frequency and time, and represent the most elementary approach which can still retain physical meaning.

In the copending application of Richard E. Williams and Harold C. Glass entitled, "Speech-to-Digital Converter," Serial No. 860, filed December 18, 1959, a system is described in which the frequency spectrum essential to speech intelligibility is divided into a sufficient number of bands to yield to an elementary sound analysis. These frequency bands are sampled at a time rate great enough to obtain an accurate identification of the energy present in each band while being small enough to prevent the overlooking of any sounds of short duration. An optical system is used to display the signals being analyzed, and these signals are compared optically with a basic reference alphabet of sounds. The best comparison obtained by this method is selected and identified by means of digital code byte. The term byte as used here and throughout this application designates a plurality of bits of digital information which represent a portion of a complete word.

The system described in detail in the present application receives the digital code byte from the speech-to-digital converter described in the above mentioned copending application and processes this informaton to reconvert it into words which are identified by an appropriate digital code notation. The digital code word output of the system may be utilized to activate a printer, if a written indication is desired, or the information may be stored and subsequently utilized in any desired manner, or reconverted back to speech by a process which is the inverse of the system described.

In one arrangement of the invention, the digital bytes representing the speech sounds are translated into analog signals which are stored in the order in which they are received. When the number of stored analog signals equals the largest number of sounds (10) in any word which the system is capable of handling, the stored analog information is optically compared with a source of reference information. In the comparison process, the analog signals are displayed as a bank of lights of varying luminosity, and the reference information is in the form of optically coded images having sections of different densities. The coding is effected such that a perfect match of lights with a given photographic image will result in a reference intensity of transmitted light through the image. Associated with each photographic word image is a binary code notation identifying the image and a binary code notation identifying the number of basic sounds contained in the word. The information derived from the number of basic sounds code is used to normalize the output from the optical comparison device through circuitry which is weighted to give preference to longer words; that is, words containing the greatest number of basic sounds. The best comparison obtained for each scanning cycle of the reference information is identified, stored, and read out of the system at the end of the scanning cycle. The word output is in the form of a digital code notation.

This arrangement of the invention is illustrated in the accompanying drawings in which:

FIGS. 1 to 7 form a logic diagram of a system in accordance with the invention;

FIG. 8 shows the way in which FIGS. 1 to 7 are to be fitted together to form the complete system;

Figure 1:
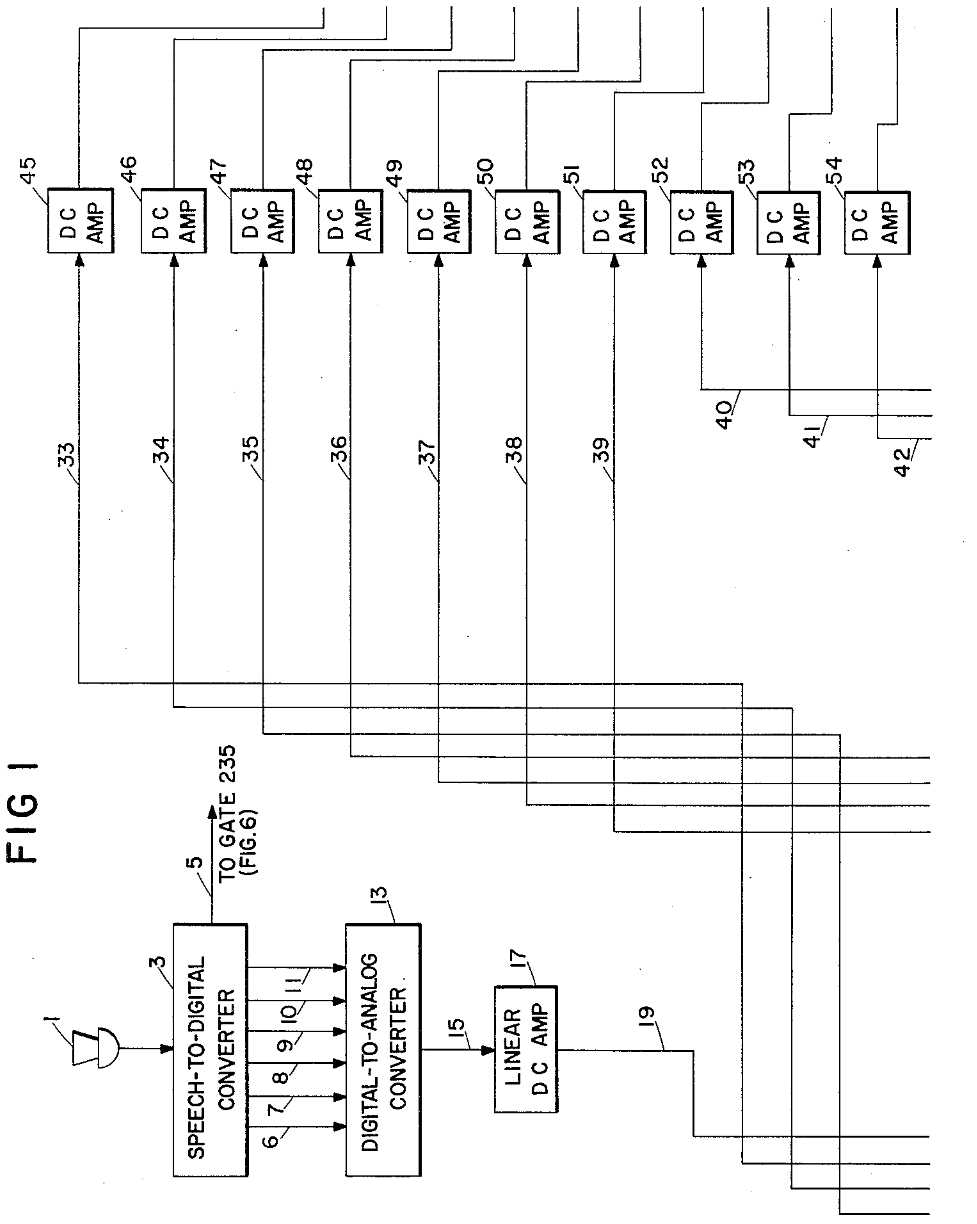
Figure 2:
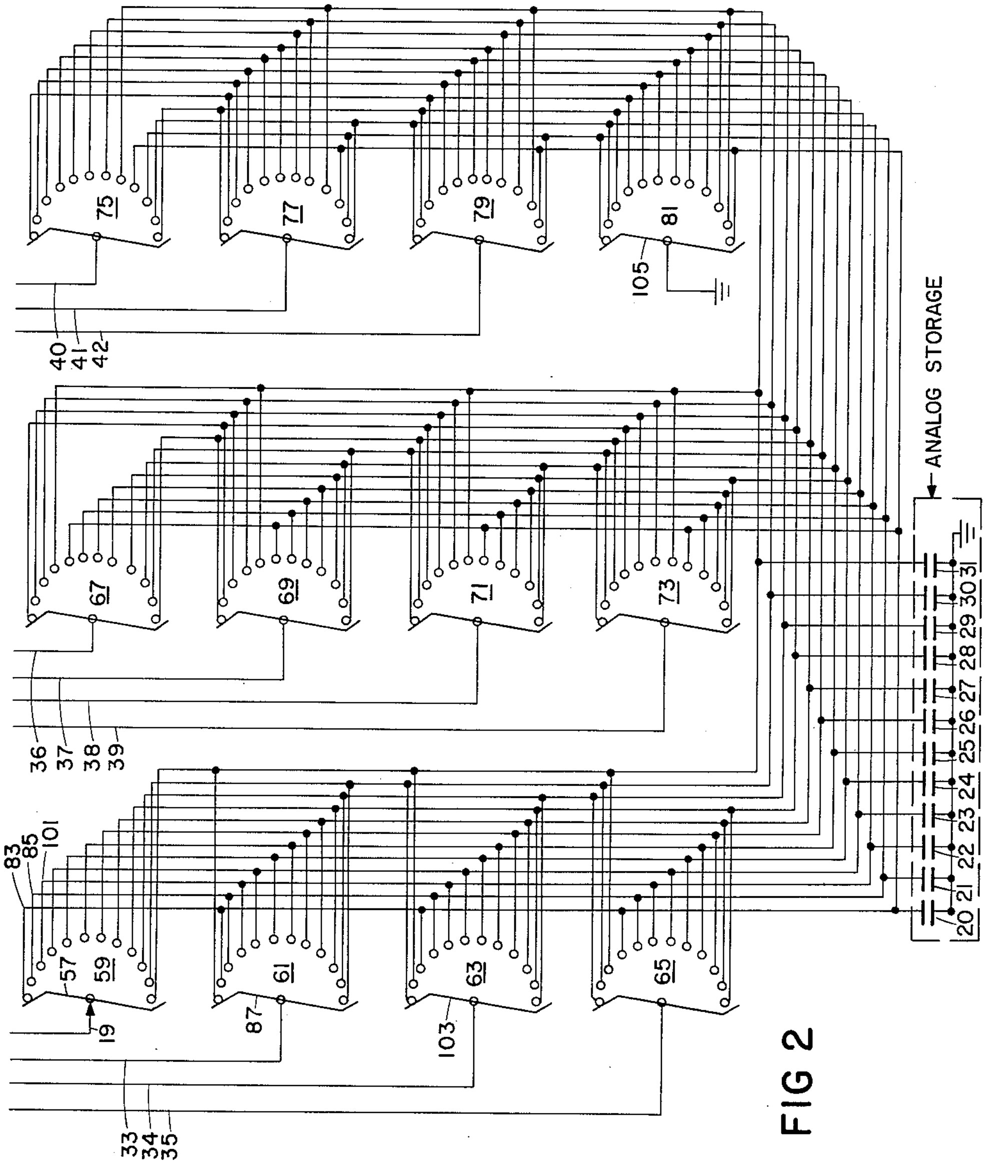

Referring now to FIGS. 1 to 7 of the drawings, and more particularly to FIGS. 1 and 2, the system includes a microphone or other acoustic transducer 1 whose output is fed to a speech-to-digital converter 3 of the type described in the copending application previously mentioned. The converter 3 has a 50 millisecond timing output lead 5 which goes to the gate 235 of FIG. 6. The information output of the speech-to-digital converter 3 is a six-bit digital byte present on lines 6 to 11 which feed into a digital-to-analog converter 13. The digital-to-analog converter 13 is merely a resistive network which combines the voltages present on leads 6 to 11 into a single output on line 15. Thus, for a six-bit digital code notation of forty basic sounds, the analog output on line 15 could assume any one of forty different values. The analog output on line 15 is amplified in a linear D.C. amplifier 17 which has an output lead 19 to a twelve section-twelve position stepping switch shown in FIG. 2. The stepping switch is connected to a bank of twelve storage capacitors 20 to 31. These storage capacitors are selectively sampled along lines 33 to 42 which feed into D.C. amplifiers 45 to 54, respectively. These D.C. amplifiers are of the high input impedance type so as not to destroy the charges on capacitors 20 to 31 as the charges are sampled. D.C. amplifiers 45 to 54 drive the display lights in the display bank generally indicated by the numeral 55. The number of display lights utilized is 10, and this number represents the maximum number of sounds of phonemes in any given word of which the system is capable of analyzing. Of course, the system could be designed to handle words having any number of sounds, but for practical purposes a limit of ten sounds per word has been found to be suitable.

The operation of the stepping switch and the manner in which the analog signals are displayed will now be described. The analog signal on line 19 is transferred to contact arm 57 of switch section 59, where the first position of the switch makes contact with lead 83 to charge storage capacitor 20. The switch is stepped in synchronism with the information output from the speech-to-digital converter 3, and its operation may be controlled by any suitable means such as a solenoid rotating mechanism operated by a control pulse originating on line 5 from the speech-to-digital converter 3. When the next analog signal is present on line 19, the switch has been stepped to its second position where the contact arm 57 of section 59 makes contact with lead 85 to charge capacitor 21. Contact arm 87 of switch section 61 is now in contact with lead 83 and samples the charge on capacitor 20 along line 33 to D.C. amplifier 45 which lights lamp 90 to a degree of luminosity indicative of the charge on capacitor 20. If forty basic phonemes or sounds are chosen as the reference alphabet, there will be forty possible degrees of luminosity for the display lamps.

When the switch is stepped to its third position, the signal on line 19 will be transferred by contact arm 57 to line 101 to charge capacitor 22. Contact arm 103 of switch section 63 will now be in contact with lead 83 to sample storage capacitor 20 along line 34 to D.C. amplifier 46, and display this signal on lamp 91. Simultaneously, contact arm 87 of switch section 61 will sample capacitor 21 and this charge will be presented to the input of D.C. amplifier 45 along line 33 to be displayed on lamp 90. It will be seen, therefore, that as the stepping switch is moved from position to position, the storage capacitors will be successively charged and displayed on the lamps 90 to 99 in serial fashion. In the twelfth position of the stepping switch, storage capacitor 20 will be discharged by the grounded contact arm 105 of switch section 81. The cycle then repeats itself with each storage capacitor being first charged, then shifted into position in the analog display light bank 55, and then discharged. It will be appreciated that while only ten channels are utilized, it is necessary to employ twelve storage capacitors, an extra capacitor being required for each of the charging and discharging cycles.

Figure 3:
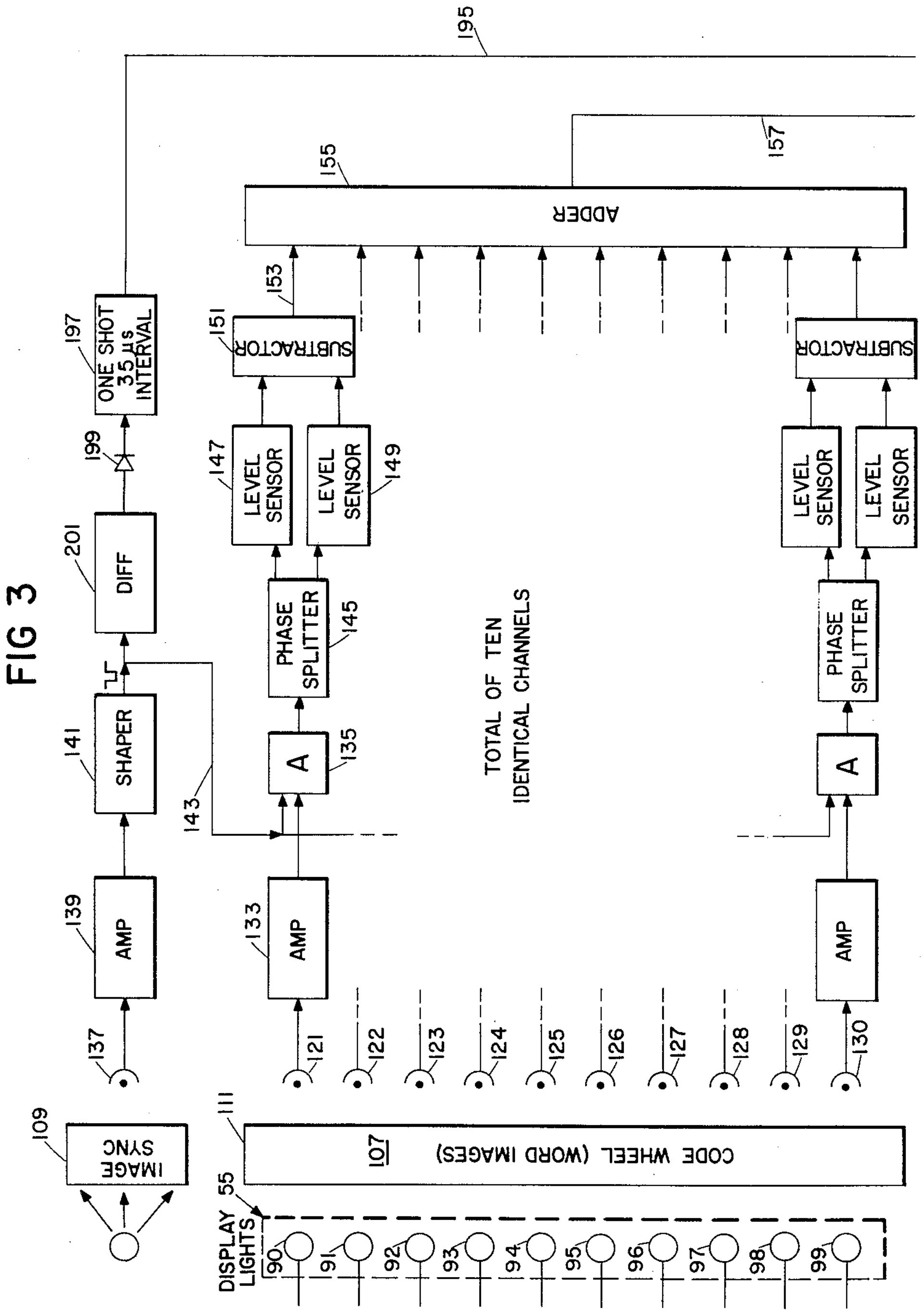
Figures 4, 8:
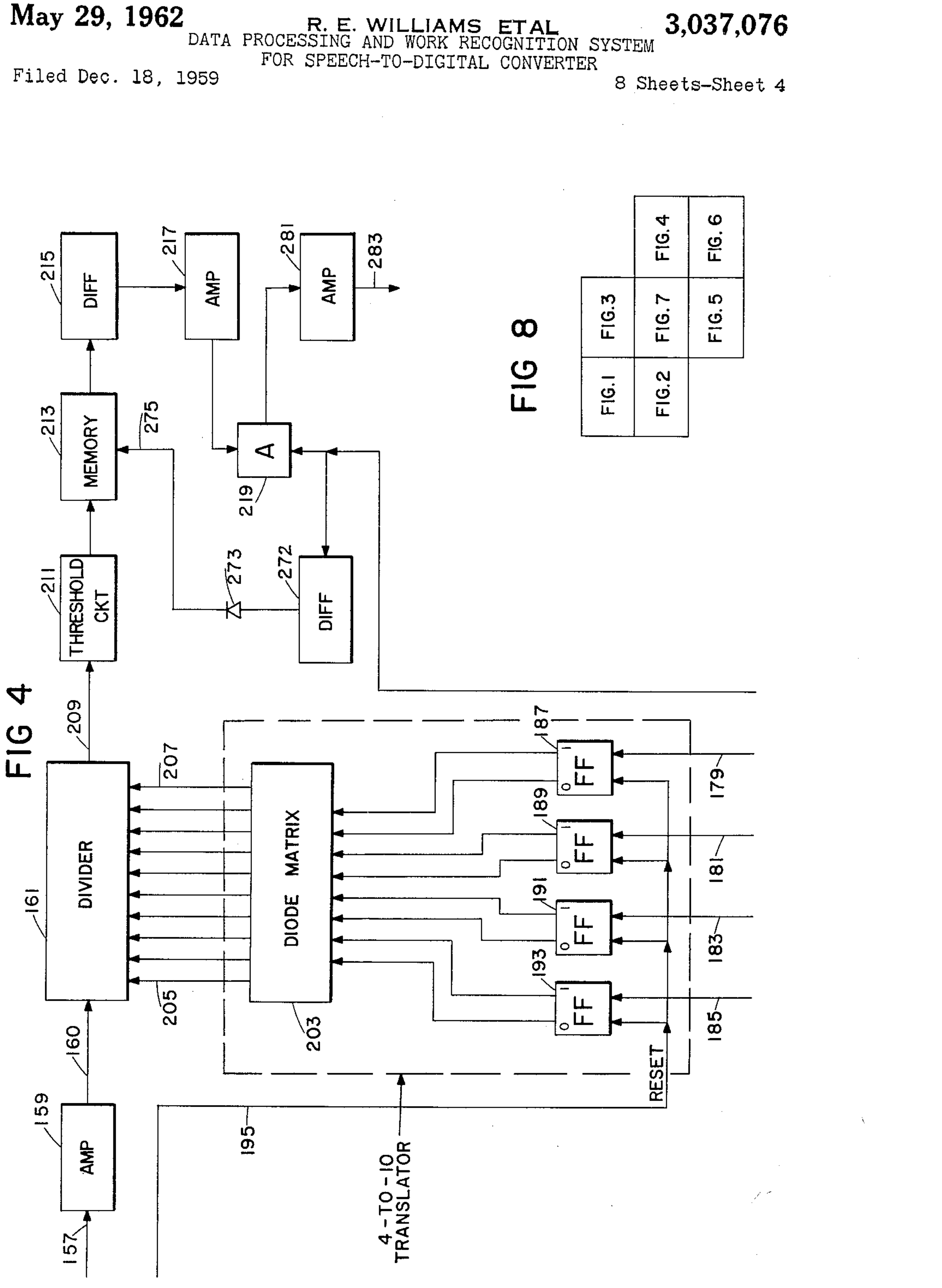
Figure 9:
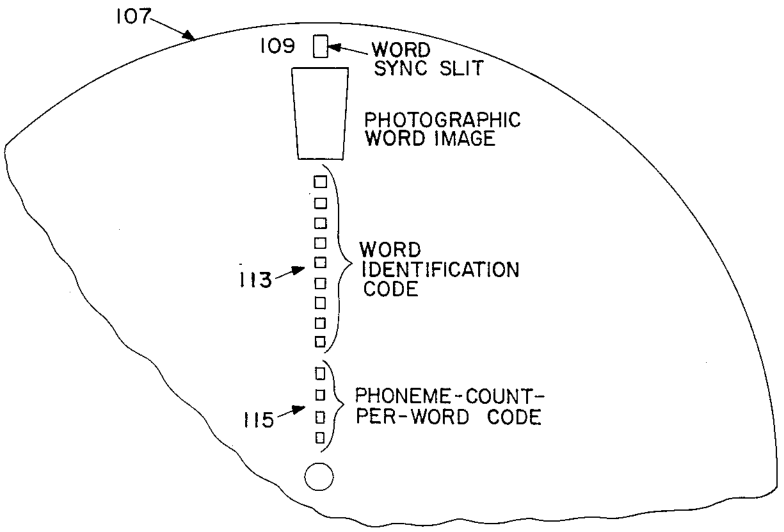
FIG. 9 is a partial view of a code wheel showing a basic layout.

FIG. 3 shows the word image portion of the code wheel 107 illustrated in block form. The details of this structure may be more readily understood by referring to FIGS. 9 and 10. In FIG. 9 the code wheel 107 is shown to include a series of radially aligned apertures. Nearest the periphery of the wheel is a word sync slit 109 associated with a photographic word image 111. The word image is identified by means of a nine-bit binary code contained in the apertures generally indicated by the numeral 113. The number of sounds or phonemes associated with each word is also contained in the four-bit binary code portion generally indicated by the numeral 115. Nine bits of information are required in the word identification code since the word vocabulary is designed for five hundred words. Of course, it will be recognized that a larger number of words could be incorporated in the vocabulary if desired. Since the phoneme count per word has been limited to ten, it is only necessary for a four-bit code notation to convey this information.

Figure 10:
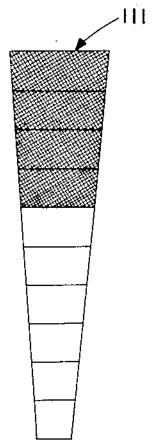
FIG. 10 is an enlarged view of a word image.

FIG. 10 is a detailed view of a photographic word image. These word images are made up of ten sections having light transmissive properties which vary in accordance with a predetermined code. The actual number of sections used in each photographic image will be dependent upon the number of phonemes or sounds present in that particular word. In the particular word image 111 shown, there are six phonemes codes in the bottom portion, and the top four sections are made opaque to prevent the transmission of any light. From the description of the operation of the capacitor storage and display lights, it will be understood that the information is stored in serial fashion beginning with the bottommost lamp and progressing upwards. The reference information is stored in the photographic images in corresponding fashion.

The code wheel 107 is designed to rotate at a speed of twenty revolutions per second, which is one revolution every fifty milliseconds. This means that it takes the code wheel fifty milliseconds to compare the information for analysis in display lights 55 with every possible vocabulary word stored in the code wheel 107. The degree of comparison is measured by means of photoelectric cells 121 to 130 which feed ten identical information channels. When a correct comparison is received, the photocells associated with the active sections of the word image will receive a transmitted light of a standard reference intensity. The photoelectric cells associated with the opaque sections of the word image will receive no light whatsoever, and this fact will be compensated for in circuitry which is to be described later.

Following the operation of a typical channel, light is received by photoelectric cell 121 and fed to amplifier 133 whose output is fed to an AND gate 135. Each word image has a sync slit 109 associated with it, and this sync slit activates a photoelectric cell 137, the output of which is amplified in amplifier 139, shaped in shaper network 141, and then used to condition AND gate 135 along line 143. The information passes through AND gate 135 to a phase splitter network 145 which divides the signal into two out-of-phase components which are introduced into level sensor networks 147 and 149. Level sensor network 147 is designed to pass only those signals above a certain critical value and level sensor network 149 is designed to pass only those signals below the same critical value. Therefore, the outputs from these networks, which are combined in subtractor network 151, will result in a signal on line 153 which is equal to or less than the critical voltage level of the level sensor networks. The net effect of the phase splitter, level sensor networks and subtractor is to normalize the information signal such that the inputs to adder 155 will all be equal and at their greatest value when a correct match is obtained, and proportionately less than this value for incorrect matches. A description of the operation of circuits similar to these, together with illustrations of the component circuitry, may be found in the copending application previously mentioned and will not be discussed here.

The output of adder 155 appears on line 157 where it is amplified by amplifier 159 and fed to a divider network 161. The divider network 161 takes the input on line 160 and normalizes it in accordance with the number of phonemes which were present in the signal under analysis.

Figure 5:
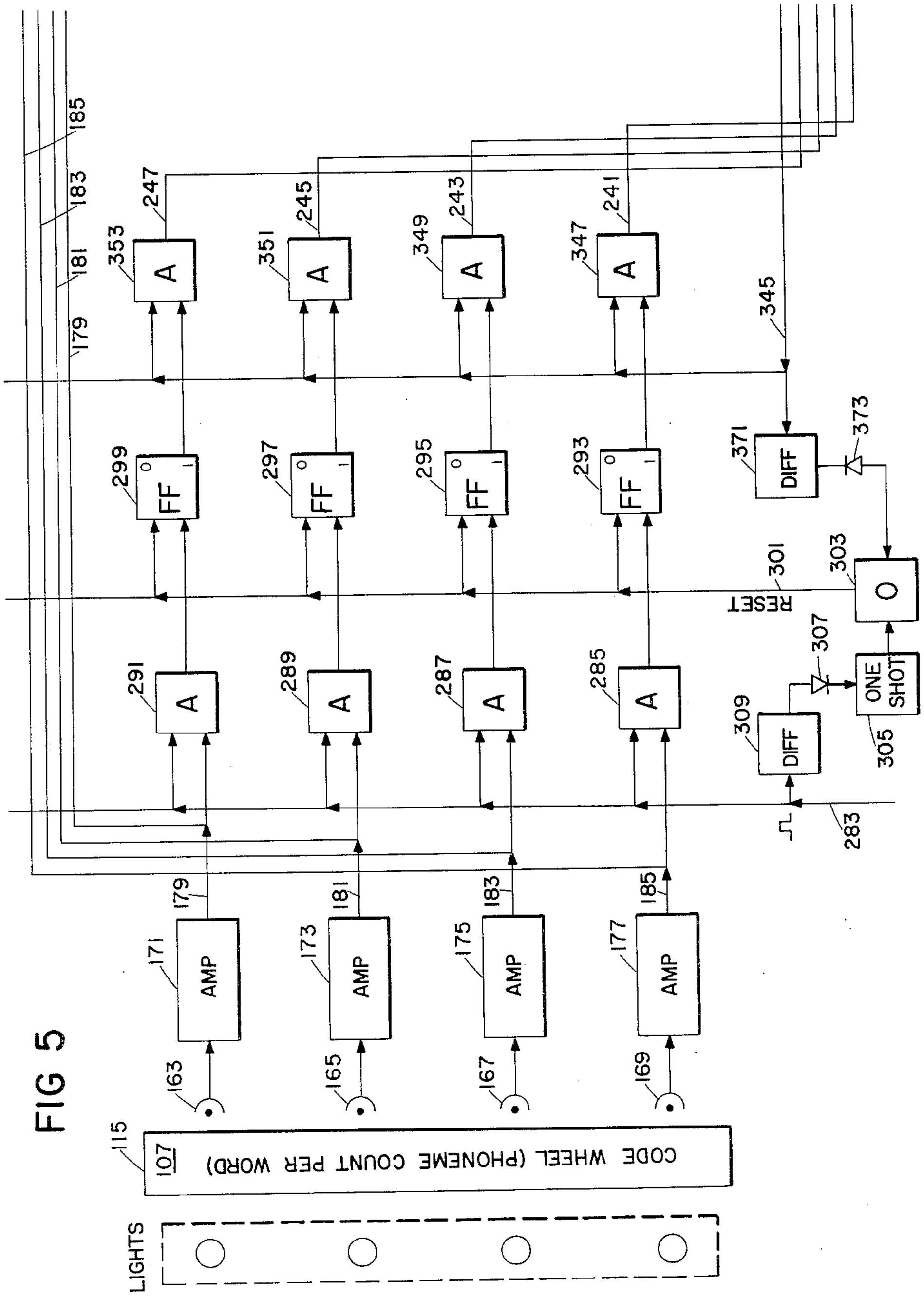

The operation of the divider and four-to-ten translator which controls the divider 161 can be understood better by referring to FIG. 5 which shows the portion 115 of the code wheel containing the phoneme count per word information. Portion 115 of code wheel 107, which contains the four-bit binary code identifying the phoneme count per word has associated therewith four photoelectric cells 163, 165, 167 and 169 feeding amplifiers 171, 173, 175 and 177, respectively. The outputs from these amplifiers are fed along lines 179, 181, 183 and 185 to the inputs of flip-flops 187, 189, 191 and 193 of the four-to-ten translator. These flip-flops are reset along line 195 from a one-shot multivibrator 197 in FIG. 3 which has a thirty-five microsecond interval. The one-shot multivibrator 197 is actuated through diode 199 from differentiator network 201, which in turn is energized from the work image sync slit 109 on code wheel 107. The outputs of flip-flops 187, 189, 191 and 193 are fed to a diode matrix 203 which yields a single one of ten possible outputs to the divider network 161 in accordance with the particular combination of four input lines energized. The four-to-ten translator essentially takes the four-bit code from code wheel 107 which indicates any given number of phonemes up to and including ten and translates this information into an output on any one of ten lines serving as inputs to divider 161. For example, if the word contained one phoneme, the binary code input on lines 179, 181, 183 and 185 of the four-to-ten translator would produce an output on line 205 to the divider 161. A word having ten phonemes would produce a binary code input on lines 179, 181, 183 and 185 which would yield an output on line 207 to the input of divider 161.

The divider network 161 is designed so that the outputs on line 209 will always be "approximately" equal when a perfect optical match is obtained, regardless of the input on line 160. The term "approximately" is used here because the voltage values on line 209 are actually graduated proportionately from a highest value when words containing ten phonemes are received to a lowest value when words containing one phoneme are received. This gradation of voltage levels in accordance with the number of sounds in the word is attained by appropriate choice of the circuit values of the divider network 161. Since the memory circuit 213 described subsequently prefers the largest signal received, this gradation of voltage levels by the divider network insures that the longest word recognized will be given preference in the recognition process. The necessity for this measure will be understood by considering the fact that many long words are made up of a composite of sounds which could be recognized as shorter words. If the system were to respond to the shortest word recognized, such a procedure would often times lead to erroneous results. The actual circuitry of the divider network 161 and diode matrix 203 are conventional and form no part of the present invention.

The output of divider network 161 is fed to a threshold circuit 211 which is actuated only by those signals exceeding a certain minimum value. This minimum value is chosen sufficiently high to prevent a large number of inaccurate indications to pass through. Threshold circuit 211 passes the signal to a memory network 213 containing a memory capacitor which is charged to the value of the input signal. Memory circuit 213 is so designed that subsequent signals from threshold circuit 211 received during the same cycle will increase the charge on the memory capacitor if they are greater than the original charging signal, and each larger signal will produced an output to differentiator network 215. Thus, the last signal of each cycle to produce an output to differentiator 215 will necessarily be the largest signal and indicative of the most acceptable match. The detail of this memory circuit are also disclosed in the copending application previously mentioned. The output of differentiator network 215 is amplified by amplifier 217 and fed to one input of an AND gate 219. The second input to AND gate 219 is from a count-to-ten network which will now be described.

Figure 6:
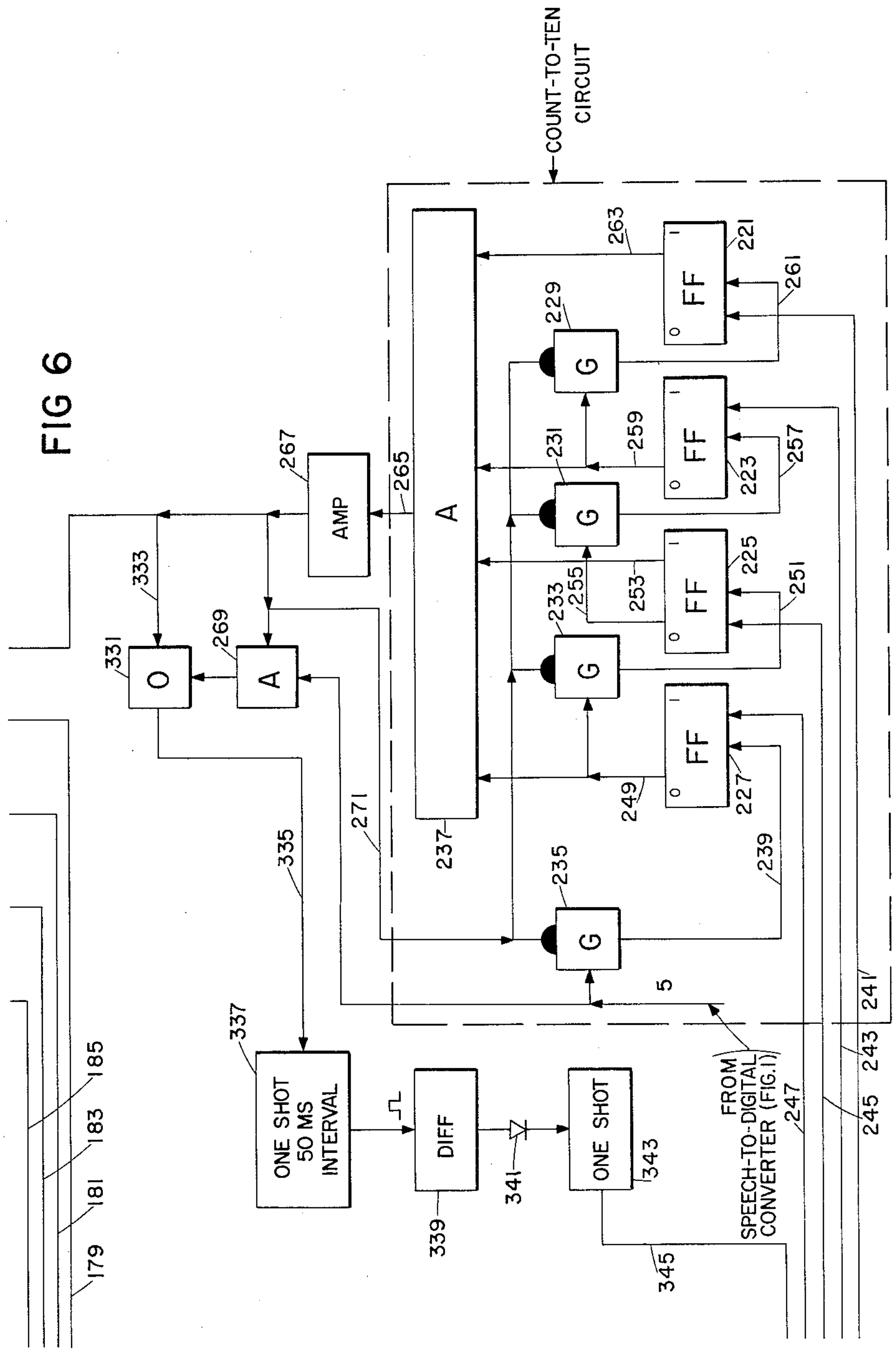

Referring now to FIG. 6, the count-to-ten circuit will be seen as comprising four flip-flops 221, 223, 225 and 227, four gate circuits 229, 231, 233 and 235, and an AND circuit 237. The input to the count-to-ten circuit is on line 5 from the speech-to-digital converter 3 of FIG. 1. Each time a digital output code indicating a phoneme identification is obtained from the speech-to-digital converter 3, a pulse will occur on line 5 and be passed through gate 235 to the complement input 239 of flip-flop 227. Assuming that flip-flops 221, 223, 225 and 227 have previously been reset by pulses on lines 241, 243, 245 and 247, the input on complement line 239 of flip-flop 227 produces an output on line 249 which passes through gate 233 to the complement input 251 of flip-flop 225. Flip-flop 225 then has an output on line 253, but neither the output on line 249 or on 253 produces an output from AND gate 237. The next pulse on line 5 again complements flip-flop 227 and returns it to the One state, producing no output. The next pulse complements flip-flop 227 to the Zero state and produces an output to gate 223 and along complement input 251 to flip-flop 225, where this flip-flop is complemented to the Zero state. Flip-flop 225 then has an output along line 255 through gate 231 to complement input 257 of flip-flop 223, producing an output on line 259 which passes through gate 229 to complement input 261 of flip-flop 221. Flip-flop 221 produces an output on line 263, but since there is no input to AND circuit 237 on line 253, there will be no output on line 265 from AND circuit 237. It will be understood from this description, that the circuit being described will continue this counting process until a ten count is reached, at which time input lines 249, 253, 259 and 263 to AND gate 237 will be energized, thereby producing an output on line 265 to amplifier 267. The output from amplifier 267 is present at AND gate 269, and also along line 271 to inhibit gates 229, 231, 233 and 235 so that subsequent pulses on line 5 will have no effect on these gates. Thus, when a count of ten is reached, the counting circuit is inhibited from further operation until the inputs on lines 249, 253, 259 and 263 to AND circuit 237 are removed by pulses on lines 241, 243, 245 and 247 to flip-flops 221, 223, 225 and 227.

The output from amplifier 267 passes through differentiator 272 and diode 273 to the erase input 275 of memory network 213, where it erases the charge on the memory capacitor and conditions this network for another cycle of operation. The output from amplifier 267 is also present at AND gate 219, and when an output is also received from amplifier 217, amplifier 281 will be energized, thereby producing an output on line 283 which goes to condition the AND gates 285, 287, 289 and 291 of FIG. 5 and to reset the flip-flops 293, 295, 297 and 299 along line 301 from OR gate 303, one-short multivibrator 305, diode 307 and differentiator network 309. When AND gates 285, 287, 289 and 291 are conditioned by a pulse on line 283, the information on lines 179, 181, 183 and 185 from the amplifier circuits will be passed through and stored in flip-flops 293, 295, 297 and 299. The information will remain stored in these flip-flops unless a better match signal is received by memory circuit 213. If this occurs, the reset process will be repeated and the more acceptable information gated into these storage flip-flops.

Figure 7:
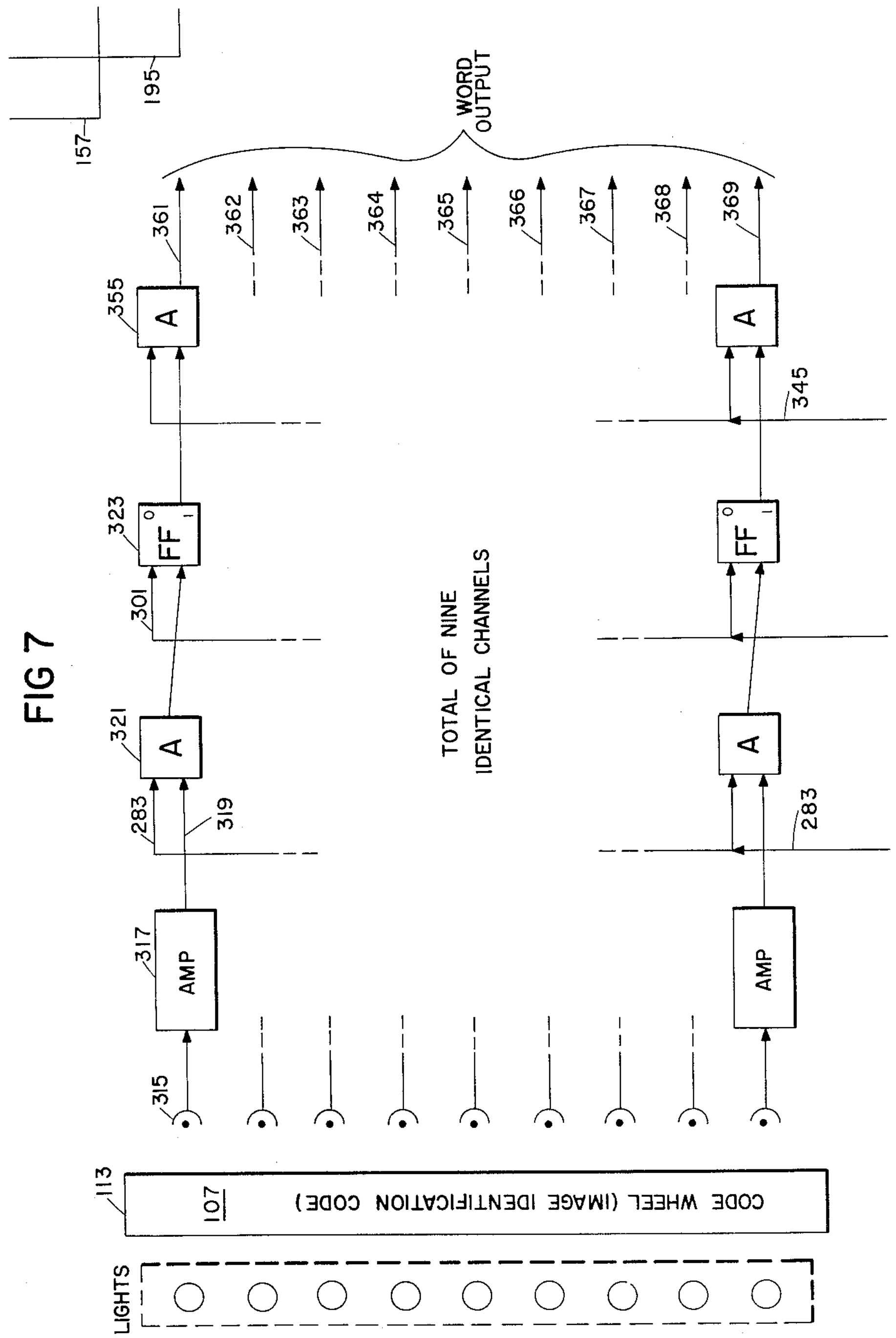

Referring now to FIG. 7 which pertains to the image identification code portion of code wheel 107, the circuitry shown is very similar to that of FIG. 5. A plurality of photoelectric cells are actuated by the nine-bit binary code on the portion 113 of code wheel 107. There are a total of nine identical channels, and the action of one channel will be described as illustrative. Photoelectric cell 315 actuates amplifier 317 to produce an input on line 319 to AND gate 321. When AND gate 321 is conditioned along line 283, the information passes through to set flip-flop 323, which was previously reset along line 301. The information stays stored in flip-flop 323 unless a more acceptable match is received by the memory circuit 213 of FIG. 4. If a more acceptable match is received, flip-flop 323 is reset, and the more acceptable information is gated in and stored. Therefore, at the end of a given cycle the flip-flop 323 will contain the code portion identifying the most acceptable match during the cycle.

Referring back now to FIG. 6, the output of amplifier 267 is anded with the pulse along line 5 at AND circuit 269, the output of which is fed to OR circuit 331. The output of amplifier 267 is also present at OR circuit 331 on line 333. Normally, the AND circuit 269 is not required since the initial pulse to OR circuit on line 333 is sufficient to initiate the read-out action. However, if no read-out was accomplished on the previous cycle, the output from amplifier 267 will remain as a D.C. level and additional provision must be made to provide a pulse to OR gate 331. AND gate 269 and the recurrent pulse on line 5 serve this purpose.

The output line 335 of OR circuit 331 actuates a one-shot multivibrator 337 having a 50 millisecond interval. The output of one-shot multivibrator 337 is differentiated in differentiator network 339 and passed through diode 341 to a second one-shot multivibrator 343. The output of one-shot multivibrator 343 is present along line 345 which serves to condition AND gates 347, 349, 351 and 353. At this point, the information stored in flip-flops 293, 295, 297 and 299 will be gated out through AND gates 347, 349, 351 and 353 along lines 241, 243, 245 and 247 to the inputs of flip-flops 221, 223, 225 and 227 of the count-to-ten circuit. Simultaneously with this operation, the AND circuit 355 of FIG. 7 will be conditioned to read out the information from flip-flop 333. This information is the word output of the system. The word output of the system is obtained along lines 361 to 369.

When a word has been read out of the system, the corresponding information in the storage capacitors of FIG. 2 and the display lights of FIG. 3 will be shifted out, and new information shifted in until the storage and display sections contain nothing but unidentified information. At this point the count-to-ten circuit will have reached a ten count and the cycle will begin all over again.

It will be appreciated that the cycle is controlled by the count-to-ten circuit, and that this circuit is reset each time information is read out. The circuit is not always reset to Zero, since very few words contain a total of ten phonemes. It is to be understood, therefore, that the phoneme count per word code is so arranged to subtract the number of phonemes in the word read out of the system from the ten count present on the count-to-ten circuit flip-flops. For example, when a cycle has been initiated the count-to-ten circuit will always be at a count of ten. Thus, if the word which is recognized and read out contains four phonemes, the pulses from AND gates 347, 349, 351 and 353 which are present on lines 241, 243, 245 and 247 to the inputs of flip-flops 221, 223, 225 and 227 of the count-to-ten circuit must be such that they reset the flip-flops to a count of six (subtract four from the count of ten). In this manner the system is assured of having a complete storage display of ten phonemes before the comparison cycle is begun.

While the invention has been illustrated and described in one arrangement, it is recognized that variations and changes may be made therein without departing from the invention as set forth in the claims.

What is claimed is:

1. A data processing system comprising an input for digital information representative of individual speech sounds, means for converting said digital information into analog information, means for sequentially storing said analog information as a plurality of signals, a source of reference information representing discrete words, means for simultaneously comparing said plurality of analog information signals with said reference information, means for indicating when the best comparison has been obtained, and means for identifying the reference information corresponding to the best comparison.

2. The combination according to claim 1 including means to give preference to the comparison containing the largest number of speech sounds.

3. A data processing system comprising an input for digital information representative of individual speech sounds, means for converting said digital information into a plurality of analog information signals, means for optically displaying said analog information signals, a source of optically coded reference information representing discrete words, means for simultaneously comparing optically the analog information signals with the source of reference information, means for indicating the best comparison obtained, and means for producing an output digital code representing the word corresponding to the best comparison obtained.

4. The combination according to claim 3 including means to give preference to the comparison containing the largest number of speech sounds.

5. An audible speech to digital code word converter comprising means for translating acoustic speech energy into electrical energy, means for converting said electrical energy into discrete digital information bytes representing the individual sounds in the speech energy, means for converting each digital information byte into an analog signal, means for sequentially storing the analog signals, a source of reference information representing discrete words, means for simultaneously comparing the sequentially stored analog signals with the source of reference information, means for indicating when a comparison has been obtained, and means for identifying the reference information corresponding to the comparison.

6. A system of the type described comprising means for translating speech sound energy into electrical energy, means for converting said electrical energy into digital information bytes representing the individual sounds present in the speech energy, means for converting the digital information bytes into analog signals, means for sequentially storing and optically displaying said analog signals, an optically coded source of reference information representing discrete words, means for simultaneously comparing the analog signals with the reference information, means for selecting the best comparison, and means for identifying the reference information corresponding to the comparison selected.

7. The combination according to claim 6 including means to give preference to the comparison containing the largest number of analog signals.

8. The combination according to claim 6 wherein the optically coded source of reference information includes a plurality of photographic images with sections of different densities.

9. The combination according to claim 8 wherein each image has indicia for identifying the particular image.

10. The combination according to claim 9 wherein the indicia also identifies the number of distinct speech sounds associated with the particular image.

11. A data processing system comprising an input for receiving digital information corresponding to speech sounds, means for converting said digital information into analog signals in the order received, means for sequentially storing a predetermined number of said analog signals, means for optically displaying said analog signals, an optically coded source of reference information representing discrete words, means for comparing the optically displayed analog signals with the reference information, means for giving preference to the information containing the largest number of analog signals, means for selecting the best comparison, and means for identifying the reference information corresponding to the comparison selected.

References Cited in the file of this patent

UNITED STATES PATENTS

| | | |
|---|---|---|
| 2,575,909 | Davis | Nov. 20, 1951 |
| 2,595,701 | Potter | May 6, 1952 |
| 2,646,465 | Davis | July 21, 1953 |